United States Patent
Yang et al.

(10) Patent No.: US 9,529,825 B2
(45) Date of Patent: Dec. 27, 2016

(54) METHOD, DEVICE AND SYSTEM FOR RESTORING RESIZED DEPTH FRAME INTO ORIGINAL DEPTH FRAME

(71) Applicant: NATIONAL CHENG KUNG UNIVERSITY, Tainan (TW)

(72) Inventors: Jar-Ferr Yang, Tainan (TW); Hung-Ming Wang, Tainan (TW); Hsi-Chun Tseng, Zhongli (TW)

(*) Notice: Subject to any disclaimer, the term of this patent is extended or adjusted under 35 U.S.C. 154(b) by 153 days.

(21) Appl. No.: 14/504,936

(22) Filed: Oct. 2, 2014

(65) Prior Publication Data
US 2015/0093020 A1 Apr. 2, 2015

(30) Foreign Application Priority Data
Oct. 2, 2013 (TW) .............................. 102135708 A (51) Int. Cl.
| | | |
|---|---|---|
| G06F 17/30 | (2006.01) | |
| G06K 9/00 | (2006.01) | |
| G06T 3/40 | (2006.01) | |
| H04N 13/00 | (2006.01) | |
| H04N 19/597 | (2014.01) | |
| H04N 19/132 | (2014.01) | |
| H04N 19/186 | (2014.01) | |
| H04N 19/182 | (2014.01) | |

(52) U.S. Cl.
CPC ..... *G06F 17/30247* (2013.01); *G06K 9/00201* (2013.01); *G06T 3/40* (2013.01); *H04N 13/0029* (2013.01); *H04N 13/0048* (2013.01); *H04N 19/132* (2014.11); *H04N 19/182* (2014.11); *H04N 19/186* (2014.11); *H04N 19/597* (2014.11); *H04N 2213/003* (2013.01)

(58) Field of Classification Search
None
See application file for complete search history.

(56) References Cited

U.S. PATENT DOCUMENTS

| | | | |
|---|---|---|---|
| 7,519,235 B1 * | 4/2009 | Georgiev .................. | G06T 3/40 382/260 |
| 8,395,617 B2 * | 3/2013 | Kao .................... | H04N 13/0029 345/419 |
| 2005/0152005 A1 | 7/2005 | Damera-Venkata | |
| 2007/0291982 A1 * | 12/2007 | Sung .................... | H04N 3/1593 382/101 |
| 2008/0058593 A1 * | 3/2008 | Gu ......................... | G06T 7/0012 600/109 |

(Continued)

FOREIGN PATENT DOCUMENTS

| | | |
|---|---|---|
| CN | 102868899 A | 1/2013 |
| EP | 0794655 A2 | 9/1997 |
| WO | WO 2009/081335 A1 | 7/2009 |

*Primary Examiner* — Michelle Entezari
(74) *Attorney, Agent, or Firm* — Muncy, Geissler, Olds & Lowe, P.C.

(57) ABSTRACT

A method, a device and a system for restoring a resized depth frame into an original depth frame are disclosed. The method for restoring a resized depth frame into an original depth frame includes the steps of: obtaining a first sub-pixel value from one pixel of the resized depth frame; storing the first sub-pixel value in all sub-pixels of a first pixel of the original depth frame; obtaining a second sub-pixel value of the pixel of the resized depth frame; and storing the second sub-pixel value to all sub-pixels of a second pixel of the original depth frame.

21 Claims, 9 Drawing Sheets

(56) References Cited

U.S. PATENT DOCUMENTS

| | | | |
|---|---|---|---|
| 2010/0310155 A1* | 12/2010 | Newton | H04N 13/0055 |
| | | | 382/154 |
| 2012/0044216 A1* | 2/2012 | Furihata | G09G 3/3688 |
| | | | 345/204 |
| 2013/0076739 A1 | 3/2013 | Cheng et al. | |
| 2014/0036033 A1* | 2/2014 | Takahashi | H04N 19/00769 |
| | | | 348/43 |

* cited by examiner

|   | 1 | 2 | 3 | 4 | 5 | 6 | 7 | 8 | 9 |
|---|---|---|---|---|---|---|---|---|---|
| 1 | R (30) | G (30) | B (30) | R (29) | G (29) | B (29) | R (100) | G (100) | B (100) |
| 2 | R (31) | G (31) | B (31) | R (30) | G (30) | B (30) | R (102) | G (102) | B (102) |
| 3 | R (32) | G (32) | B (32) | R (33) | G (33) | B (33) | R (105) | G (105) | B (105) |
| 4 | R (35) | G (35) | B (35) | R (38) | G (38) | B (38) | R (106) | G (106) | B (106) |
| 5 | R (34) | G (34) | B (34) | R (37) | G (37) | B (37) | R (103) | G (103) | B (103) |
| 6 | R (36) | G (36) | B (36) | R (39) | G (39) | B (39) | R (104) | G (104) | B (104) |

|   | 1 | 2 | 3 | 4 | 5 | 6 | 7 | 8 | 9 |
|---|---|---|---|---|---|---|---|---|---|
| 1 | R (195) | G (195) | B (195) | R (198) | G (198) | B (198) | R (200) | G (200) | B (200) |
| 2 | R (190) | G (190) | B (190) | R (197) | G (197) | B (197) | R (202) | G (202) | B (202) |
| 3 | R (187) | G (187) | B (187) | R (189) | G (189) | B (189) | R (205) | G (205) | B (205) |
| 4 | R (27) | G (27) | B (27) | R (30) | G (30) | B (30) | R (33) | G (33) | B (33) |
| 5 | R (26) | G (26) | B (26) | R (32) | G (32) | B (32) | R (34) | G (34) | B (34) |
| 6 | R (28) | G (28) | B (28) | R (31) | G (31) | B (31) | R (35) | G (35) | B (35) |

METHOD, DEVICE AND SYSTEM FOR RESTORING RESIZED DEPTH FRAME INTO ORIGINAL DEPTH FRAME

CROSS REFERENCE TO RELATED APPLICATIONS

This Non-provisional application claims priority under 35 U.S.C. §119(a) on Patent Application No(s). 102135708 filed in Taiwan, Republic of China on Oct. 2, 2013, the entire contents of which are hereby incorporated by reference.

BACKGROUND OF THE INVENTION

Field of Invention

The present invention relates to a method, a device and a system for restoring a resized depth frame into an original depth frame.

Related Art

As the progress of technologies, the performance and quality of electronic products have become the prior consideration of electronic product development. For example, the basic requirement for display devices is to provide a high-definition and more comfortable images. Except for the basic requirement, the manufacturer further develops the 3D display device for providing a new visual experience to the users.

In general, a 3D image generating system can analyze the original 2D image data (e.g. an original color frame) so as to produce an original depth frame corresponding to the original color frame, and then transmit the original color frame and the original depth frame to a 3D display device of the user through the conventional transmission apparatus. After receiving the original color frame and the original depth frame, the 3D display device can perform a restore calculation to generate two or more multi-view angle images for any naked-eye 3D display device or to generate a left-eye image and a right-eye image for a glasses-type 3D display device.

SUMMARY OF THE INVENTION

An objective of the present invention is to provide a method, a device and a system for restoring a resized depth frame into an original depth frame, which are different from the conventional method, device and system and can be applied to 3D image restoring system.

To achieve the above objective, the present invention discloses a method for restoring a resized depth frame into an original depth frame. The method includes the following steps of: obtaining a first sub-pixel value from one pixel of the resized depth frame; storing the first sub-pixel value in all sub-pixels of a first pixel of the original depth frame; obtaining a second sub-pixel value of the pixel of the resized depth frame; and storing the second sub-pixel value to all sub-pixels of a second pixel of the original depth frame.

To achieve the above objective, the present invention also discloses a device for restoring a resized depth frame into an original depth frame. The device includes a pixel retrieving unit and a pixel storing unit. The pixel retrieving unit is configured for obtaining at least a first sub-pixel value and a second sub-pixel value from a pixel of the resized depth frame. The pixel storing unit is configured for storing the first sub-pixel value in all sub-pixels of a first pixel of the original depth frame, and storing the second sub-pixel value to all sub-pixels of a second pixel of the original depth frame.

To achieve the above objective, the present invention further discloses a system for restoring a resized depth frame into an original depth frame. The system includes a memory unit and a processing unit. The memory unit stores the resized depth frame. The processing unit is configured for obtaining at least a first sub-pixel value and a second sub-pixel value from a pixel of the resized depth frame, storing the first sub-pixel value in all sub-pixels of a first pixel of the original depth frame, and storing the second sub-pixel value to all sub-pixels of a second pixel of the original depth frame.

In one embodiment, each of the pixels of the resized depth frame has three sub-pixels. The step of storing the first sub-pixel value is to store the first sub-pixel value into the three sub-pixels of the first pixel of the original depth frame. The step of storing the second sub-pixel value is to store the second sub-pixel value into the three sub-pixels of the second pixel of the original depth frame.

In one embodiment, each of the pixels of the original depth frame has three sub-pixels, and each of the sub-pixels have the same sub-pixel values.

In one embodiment, the first pixel and the second pixel of the original depth frame are positioned at the same column of the original depth frame.

In one embodiment, the first pixel and the second pixel of the original depth frame are positioned at the same row of the original depth frame.

In one embodiment, the size of the original depth frame is triple of the resized depth frame along a column direction.

In one embodiment, the size of the original depth frame is triple of the resized depth frame along a row direction.

As mentioned above, the method for restoring a resized depth frame into an original depth frame includes the steps of: obtaining a first sub-pixel value from one pixel of the resized depth frame; storing the first sub-pixel value in all sub-pixels of a first pixel of the original depth frame; obtaining a second sub-pixel value of the pixel of the resized depth frame; and storing the second sub-pixel value to all sub-pixels of a second pixel of the original depth frame. Accordingly, the method, device and system for restoring a resized depth frame into an original depth frame of the invention are different from the conventional method, device and system and can be applied to 3D image restoring system.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
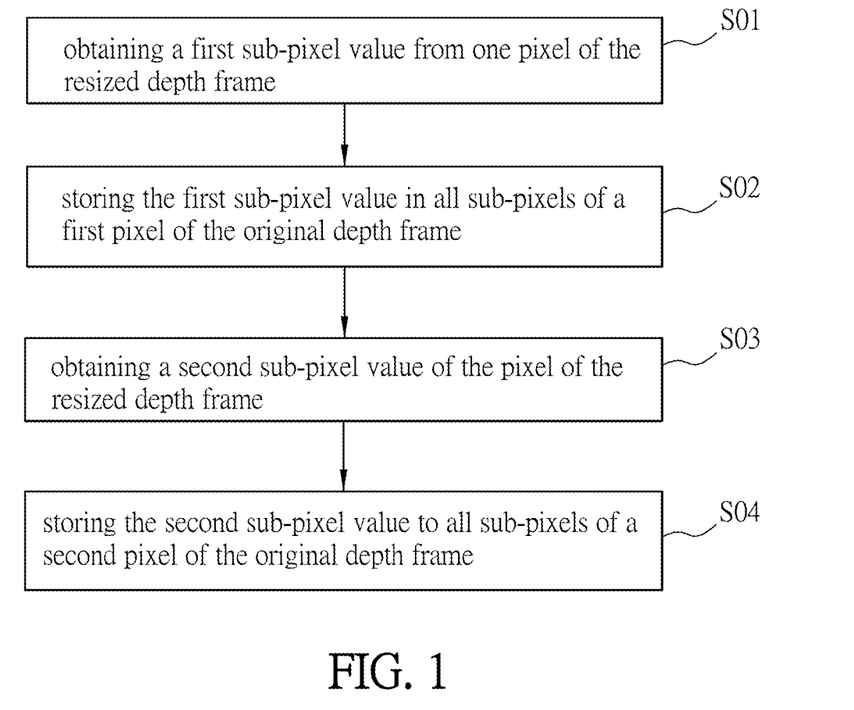
FIG. 1 is a flow chart of a method for restoring a resized depth frame into an original depth frame according to a preferred embodiment of the invention.
Figure 2:
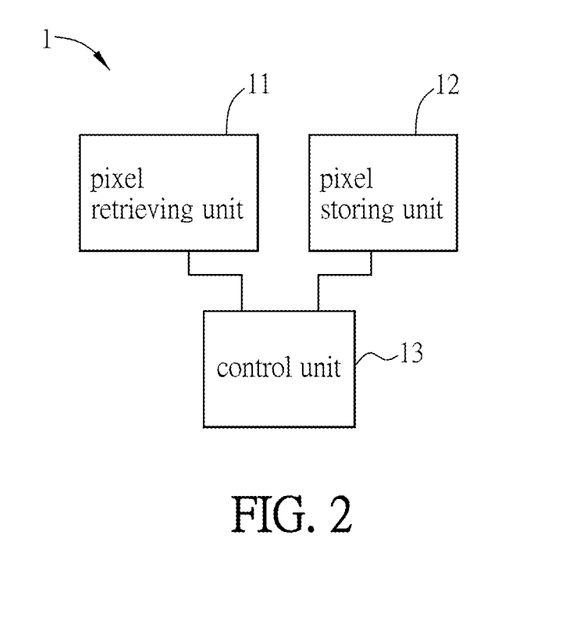
FIG. 2 is a functional block diagram of a device for restoring a resized depth frame into an original depth frame according to a preferred embodiment of the invention.

FIG. 1 is a flow chart of a method for restoring a resized depth frame into an original depth frame according to a preferred embodiment of the invention, and FIG. 2 is a functional block diagram of a device for restoring a resized depth frame into an original depth frame according to a preferred embodiment of the invention.

Referring to FIG. 1, the method for restoring a resized depth frame into an original depth frame according to a preferred embodiment of the invention includes steps S01 to S04. The step S01 is to obtain a first sub-pixel value from one pixel of the resized depth frame. The step S02 is to store the first sub-pixel value in all sub-pixels of a first pixel of the original depth frame. The step S03 is to obtain a second sub-pixel value of the pixel of the resized depth frame. The step S04 is to store the second sub-pixel value to all sub-pixels of a second pixel of the original depth frame. In this case, the resized depth frame can be generated based on an original multi-view color frame (2D color image of multiple viewing angles, which is referred to an original color frame hereinafter). In the steps S01 and S02, the first pixel and the second pixel of the original depth frame are located at the same column or row of the original depth frame. The details will be discussed hereinafter.

With reference to FIG. 2, the device 1 for restoring a resized depth frame into an original depth frame includes a pixel retrieving unit 11, a pixel storing unit 12 and a control unit 13. The control unit 13 is electrically connected with the pixel retrieving unit 11 and the pixel storing unit 12. The pixel retrieving unit 11 obtains at least a first sub-pixel value and a second sub-pixel value from one pixel of the restored depth frame. The pixel storing unit 12 stores the retrieved first sub-pixel value into all sub-pixels of a first pixel of the original depth frame, and stores the retrieved second sub-pixel value into all sub-pixels of a second pixel of the original depth frame. Herein, the pixel retrieving unit 11 and the pixel storing unit 12 can be implemented by software, hardware or firmware, and this invention is not limited. The control unit 13 includes the core control assembly of the device 1 such as a CPU or the combination of any suitable hardware, software or firmware. The control unit 13 can control the pixel retrieving unit 11 to obtain the sub-pixel value of each pixel of the resized depth frame, and control the pixel storing unit 12 to store the retrieved sub-pixel value into all corresponding sub-pixels of the original depth frame. The above method and device 1 will be further described in detail with reference to FIGS. 3A to 3C.

Figure 3A:
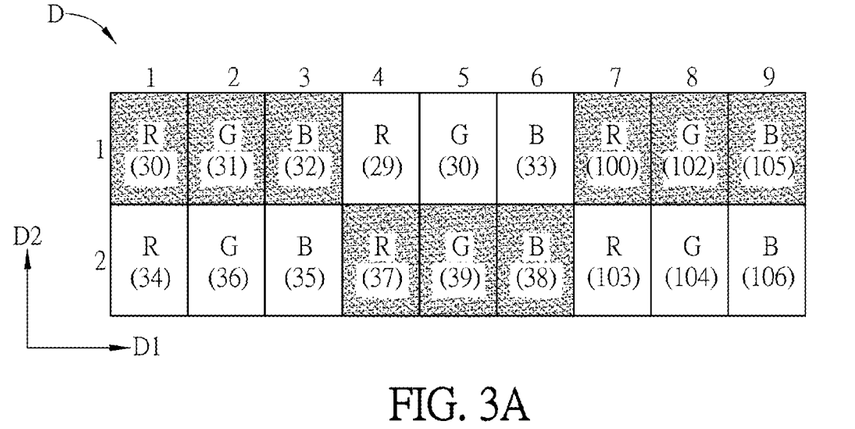
FIG. 3A is a schematic diagram showing a resized depth frame according to the preferred embodiment of the invention.
Figure 3B:
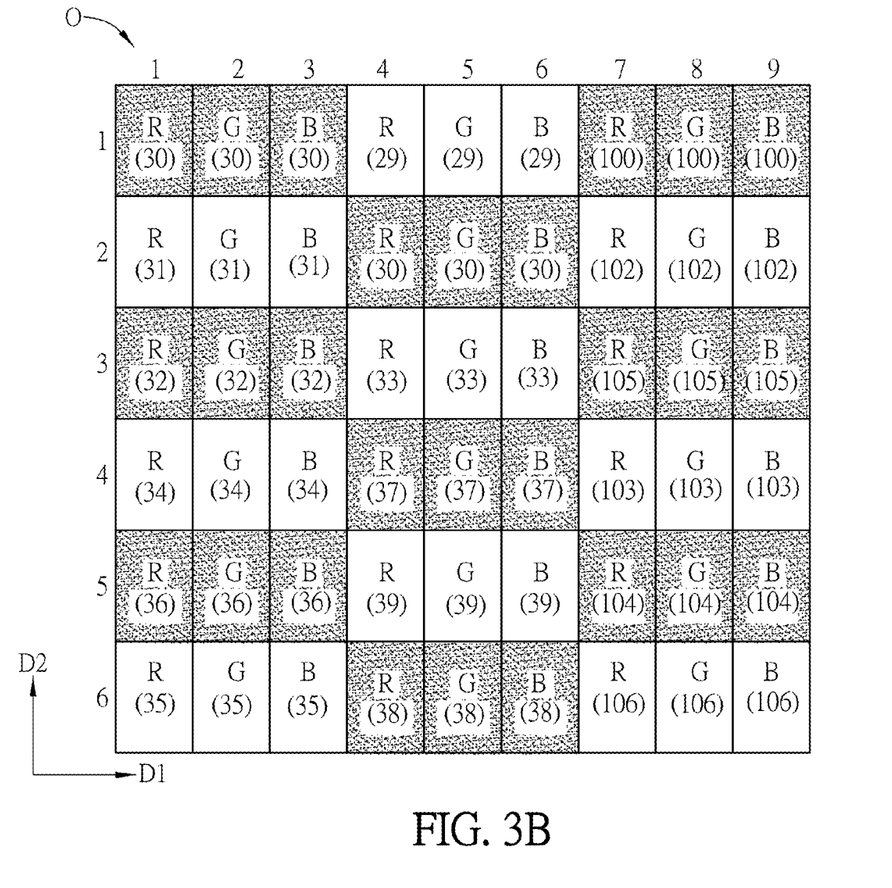
FIGS. 3B and 3C are schematic diagrams showing two restored original depth frames, respectively, according to the preferred embodiment of the invention.

FIGS. 3A and 3B show a resized depth frame D and an original depth frame O, respectively. Herein, the resized depth frame D is a gray-level frame, and each pixel has three sub-pixels including red, green and blue (R, G, B) sub-pixels. In addition, each pixel of the original depth frame O also has three sub-pixels including red, green and blue (R, G, B) sub-pixels. In this embodiment, the resized depth frame D includes 3×2=6 pixels, so it totally includes 9×2=18 sub-pixels. The position and value of each sub-pixel will be represented by a corresponding code hereinafter. For example, the sub-pixel at the first column and the first row of FIG. 3A is represented by R(30), which means this sub-pixel is a red sub-pixel (sub-pixel R) and the sub-pixel value thereof is 30, and the location of this sub-pixel is represented by (1,1). In addition, the sub-pixel at the fifth column and the second row is represented by G(39), which means this sub-pixel is a green sub-pixel (sub-pixel G) and the sub-pixel value thereof is 39, and the location of this sub-pixel is represented by (5,2).

In the embodiment, the method is to obtain a first sub-pixel value, a second sub-pixel value and a third sub-pixel value of a pixel of the resized depth frame D by the pixel retrieving unit 11. Then, the pixel storing unit 12 stores the retrieved first sub-pixel value into all sub-pixels of a first pixel of the original depth frame O, stores the retrieved second sub-pixel value into all sub-pixels of a second pixel of the original depth frame O, and stores the retrieved third sub-pixel value into all sub-pixels of a third pixel of the original depth frame O. As shown in FIGS. 3A and 3B, the first sub-pixel value (30) is obtained from the position (1,1) (sub-pixel R) of the resized depth frame D, the second sub-pixel value (31) is obtained from the position (2,1) (sub-pixel G) of the resized depth frame D, and the third sub-pixel value (32) is obtained from the position (3,1) (sub-pixel B) of the resized depth frame D. Then, the pixel storing unit 12 stores the first sub-pixel value (30) into the sub-pixel R (1,1), sub-pixel G (2,1) and sub-pixel B (3,1) of the first pixel of the original depth frame O, stores the second sub-pixel value (31) into the sub-pixel R (1,2), sub-pixel G (2,2) and sub-pixel B (3,2) of the second pixel of the original depth frame O, and stores the third sub-pixel value (32) into the sub-pixel R (1,3), sub-pixel G (2,3) and sub-pixel B (3,3) of the third pixel of the original depth frame O. Herein, the first pixel, the second pixel and the third pixel (as well as the same sub-pixels) are located at the same column of the original depth frame O.

Next, in another pixel of the resized depth frame D, the first sub-pixel value (34) is obtained from the position (1,2) (sub-pixel R), the second sub-pixel value (36) is obtained from the position (2,2) (sub-pixel G), and the third sub-pixel value (35) is obtained from the position (3,2) (sub-pixel B). Then, the pixel storing unit 12 stores the first sub-pixel value (34) into the sub-pixel R (1,4), sub-pixel G (2,4) and sub-pixel B (3,4) of the fourth pixel of the original depth frame O, stores the second sub-pixel value (36) into the sub-pixel R (1,5), sub-pixel G (2,5) and sub-pixel B (3,5) of the fifth pixel of the original depth frame O, and stores the third sub-pixel value (35) into the sub-pixel R (1,6), sub-pixel G (2,6) and sub-pixel B (3,6) of the sixth pixel of the original depth frame O.

Figure 3C:
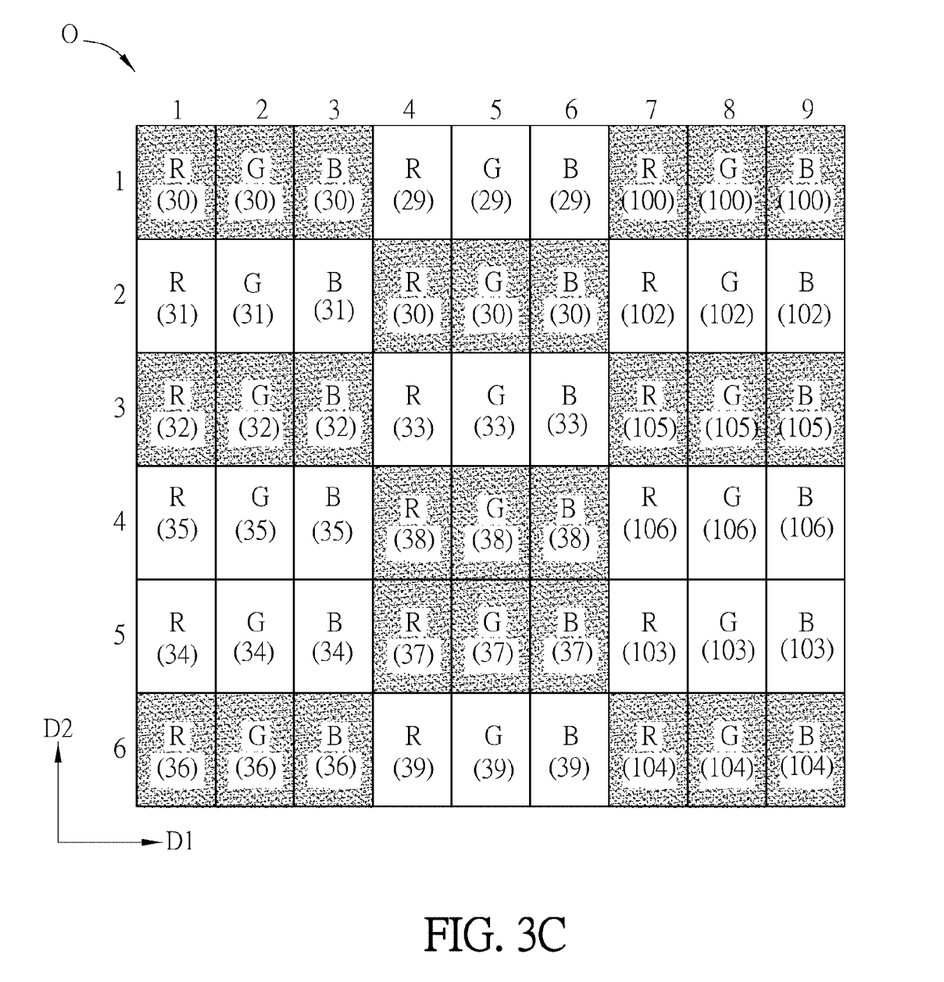

In still another pixel of the resized depth frame D, the first sub-pixel value (29) is obtained from the position (4,1) (sub-pixel R), the second sub-pixel value (30) is obtained from the position (5,1) (sub-pixel G), and the third sub-pixel value (33) is obtained from the position (6,1) (sub-pixel B). Then, the pixel storing unit 12 stores the first sub-pixel value (29) into the sub-pixel R (4,1), sub-pixel G (5,1) and sub-pixel B (6,1) of the seventh pixel of the original depth frame O, stores the second sub-pixel value (30) into the sub-pixel R (4,2), sub-pixel G (5,2) and sub-pixel B (6,2) of the eighth pixel of the original depth frame O, and stores the third sub-pixel value (33) into the sub-pixel R (4,3), sub-pixel G (5,3) and sub-pixel B (6,3) of the ninth pixel of the original depth frame O. In the final pixel of the resized depth frame D, the first sub-pixel value (103) is obtained from the position (7,2) (sub-pixel R), the second sub-pixel value (104) is obtained from the position (8,2) (sub-pixel G), and the third sub-pixel value (105) is obtained from the position (9,2) (sub-pixel B). Then, the pixel storing unit 12 stores the first sub-pixel value (103) into the sub-pixel R (7,4), sub-pixel G (8,4) and sub-pixel B (9,4) of the sixteenth pixel of the original depth frame O, stores the second sub-pixel value (104) into the sub-pixel R (7,5), sub-pixel G (8,5) and sub-pixel B (9,5) of the seventeenth pixel of the original depth frame O, and stores the third sub-pixel value (106) into the sub-pixel R (7,5), sub-pixel G (8,5) and sub-pixel B (9,5) of the eighteenth pixel of the original depth frame O. Therefore, the size of the original depth frame O is triple of the resized depth frame D along the column direction, and is equivalent to the resized depth frame D along the row direction. Regarding to the total data volume, the data volume of the original depth frame O is triple of the resized depth frame D. The order for retrieving the sub-pixel values is for an example only. In other embodiments, the order for retrieving and storing the sub-pixel values can be different (or the relative positions of the resized data can be different) so as to improve the accuracy of the restored size. For example, the first, second and third rows of FIG. 3C have the same order as the first, second and third rows of FIG. 3B, but the fourth, fifth and sixth rows of FIG. 3C are the result of shifting the fourth, fifth and sixth rows of FIG. 3B by one row. Herein, the fourth row of FIG. 3B is the same as the fifth row of FIG. 3C, the fifth row of FIG. 3B is the same as the sixth row of FIG. 3C, and the sixth row of FIG. 3B is the same as the fourth row of FIG. 3C. The rearrangement or shift of the sub-pixel values is for an illustration only, and this invention is not limited thereto. Accordingly, the data in the resized depth frame and the original depth frame can have different orders, so that the resized depth frame can still keep the accuracy.

Figure 4A:
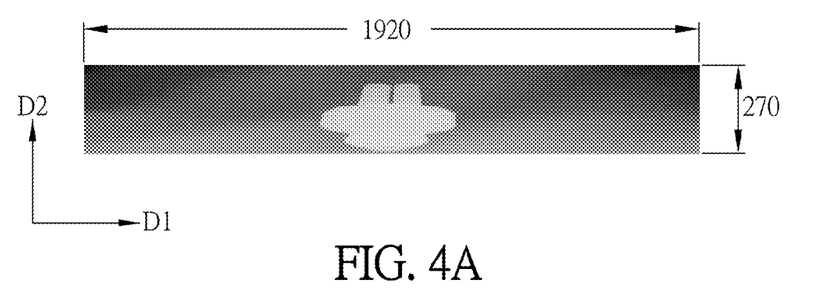
FIG. 4A is a schematic diagram showing the image of a resized depth frame according to the preferred embodiment of the invention.
Figure 4B:
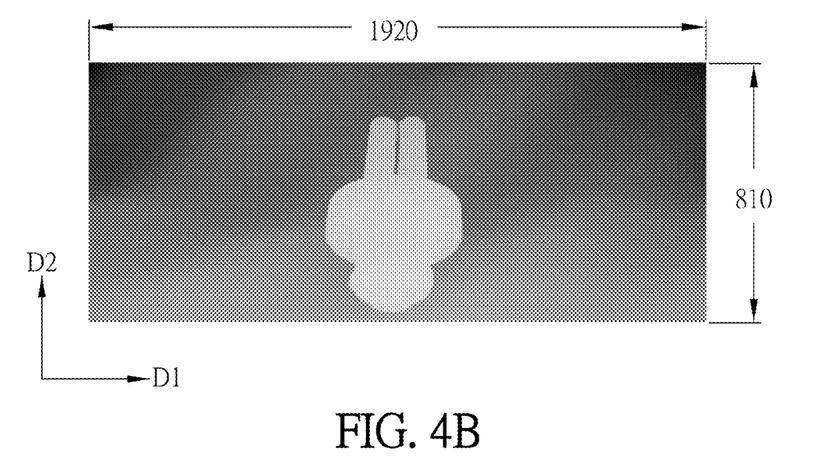
FIG. 4B is a schematic diagram showing the image of a restored original depth frame (by the method of FIG. 3B) according to the preferred embodiment of the invention.
Figure 4C:
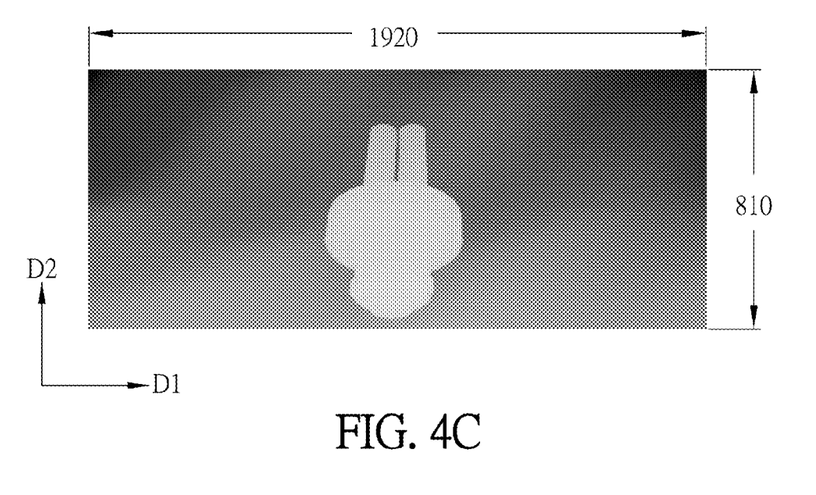
FIG. 4C is a schematic diagram showing the image of another restored original depth frame (by the method of FIG. 3C) according to the preferred embodiment of the invention.

FIG. 4A is a schematic diagram showing the image of a resized depth frame according to the preferred embodiment of the invention, FIG. 4B is a schematic diagram showing the image of a restored original depth frame (by the method of FIG. 3B) according to the preferred embodiment of the invention, and FIG. 4C is a schematic diagram showing the image of another restored original depth frame (by the method of FIG. 3C) according to the preferred embodiment of the invention. Herein, the image of the resized depth frame of FIG. 4C is similar to that of FIG. 4A, so it is not shown. FIGS. 4B and 4C correspond to the methods of FIGS. 3B and 3C, respectively. Although the resizing methods for FIGS. 4B and 4C are different, the shown images in FIGS. 4B and 4C are very close and seem the same as viewing by eyes. The size (resolution) of the gray-level frame in FIG. 4A is 1920×270, and the size (resolution) of the gray-level frame in FIGS. 4B and 4C is 1920×810 (wherein, 810=270×3). As a result, the size of the original depth frame in FIGS. 4B and 4C is triple of the resized depth frame in FIG. 4A.

Figure 5A:
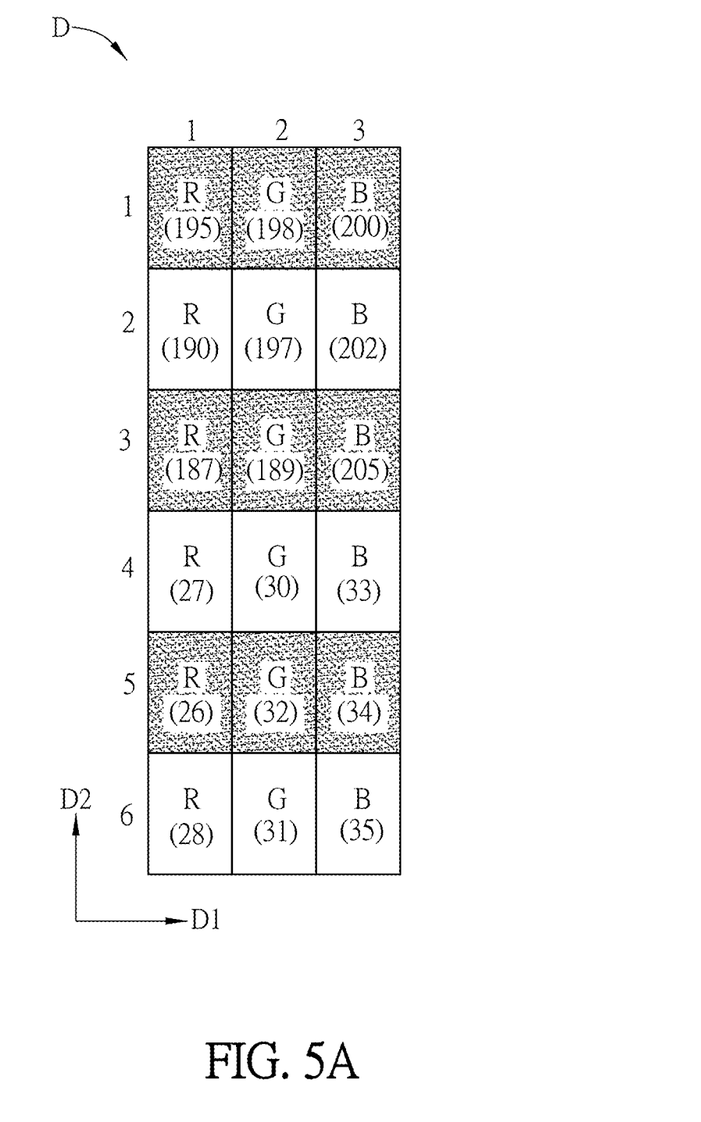
FIGS. 5A and 5B are schematic diagrams showing the original depth frame and resized depth frame according to another aspect of the invention.
Figure 5B:
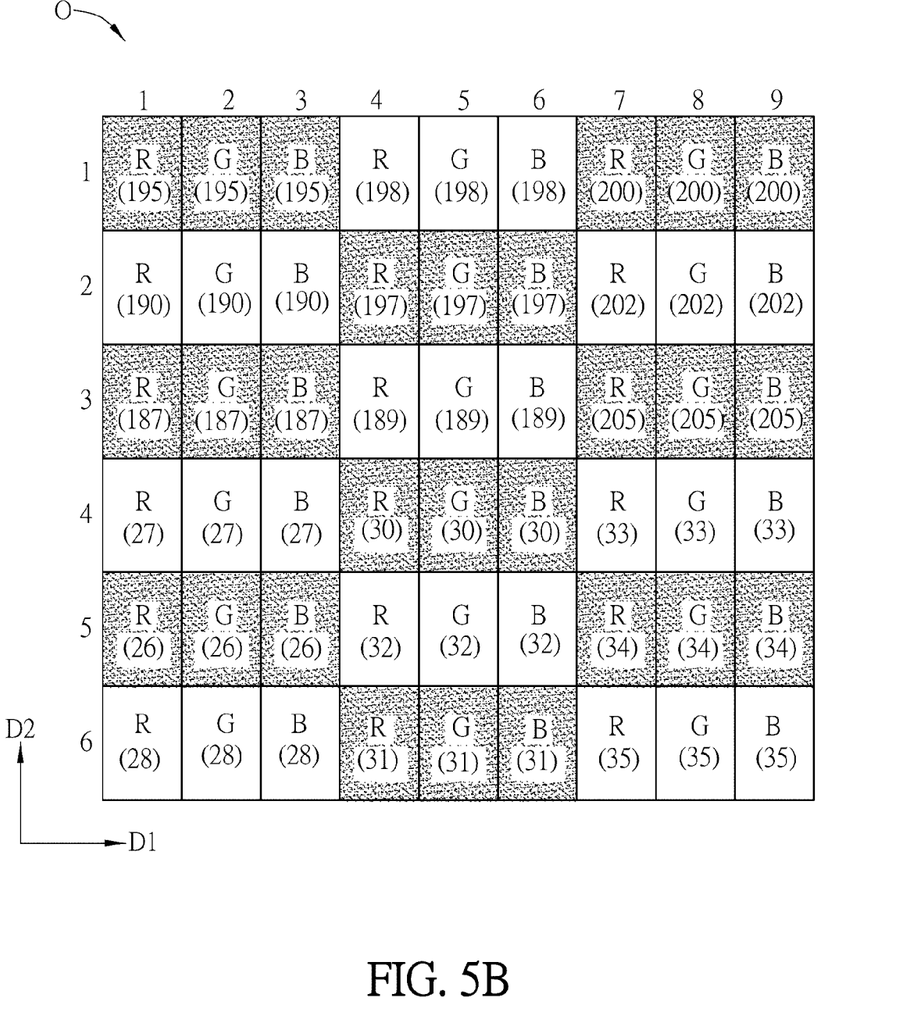

FIGS. 5A and 5B are schematic diagrams showing the original depth frame O and resized depth frame D according to another aspect of the invention. Herein, the resized depth frame D is still a gray-level frame, each pixel of the resized depth frame D also has three sub-pixels (R, G, B). In addition, each pixel of the original depth frame O also has three sub-pixels (R, G, B). In this embodiment, the resized depth frame D includes 1×6=6 pixels, so it has 3×6=18 sub-pixels. The position and value of each sub-pixel will be represented by a corresponding code. For example, the sub-pixel at the first column and the first row of FIG. 5A is represented by R(195), which means this sub-pixel is a red sub-pixel (sub-pixel R) and the sub-pixel value thereof is 195, and the location of this sub-pixel is represented by (1,1). In addition, the sub-pixel at the third column and the second row is represented by B(202), which means this sub-pixel is a blue sub-pixel (sub-pixel B) and the sub-pixel value thereof is 202, and the location of this sub-pixel is represented by (3,2).

Figure 5C:
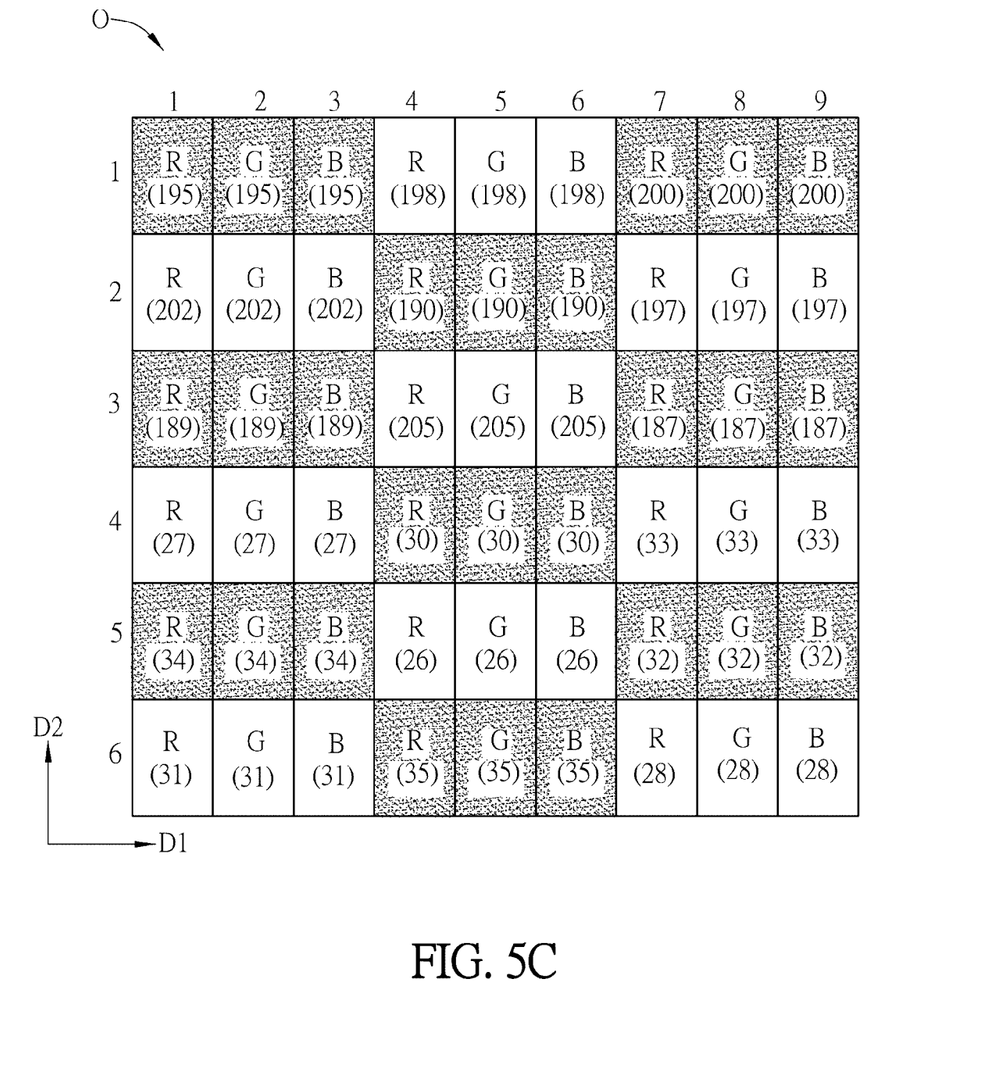
FIG. 5C is a schematic diagram showing a resized depth frame according to another aspect of the invention.

In the embodiment, as shown in FIGS. 5A and 5B, the first sub-pixel value (195) is obtained from the position (1,1) (sub-pixel R) of the resized depth frame D, the second sub-pixel value (198) is obtained from the position (2,1) (sub-pixel G) of the resized depth frame D, and the third sub-pixel value (200) is obtained from the position (3,1) (sub-pixel B) of the resized depth frame D. Then, the pixel storing unit 12 stores the first sub-pixel value (195) into the sub-pixel R (1,1), sub-pixel G (2,1) and sub-pixel B (3,1) of the first pixel of the original depth frame O, stores the second sub-pixel value (198) into the sub-pixel R (4,1), sub-pixel G (5,1) and sub-pixel B (6,1) of the second pixel of the original depth frame O, and stores the third sub-pixel value (200) into the sub-pixel R (7,1), sub-pixel G (8,1) and sub-pixel B (9,1) of the third pixel of the original depth frame O. Herein, the first pixel, the second pixel and the third pixel are located at the same row of the original depth frame O. Next, in another pixel of the resized depth frame D, the first sub-pixel value (190) is obtained from the position (1,2) (sub-pixel R) of the resized depth frame D, the second sub-pixel value (197) is obtained from the position (2,2) (sub-pixel G) of the resized depth frame D, and the third sub-pixel value (202) is obtained from the position (3,2) (sub-pixel B) of the resized depth frame D. Then, the pixel storing unit 12 stores the first sub-pixel value (190) into the sub-pixel R (1,2), sub-pixel G (2,2) and sub-pixel B (3,2) of the fourth pixel of the original depth frame O, stores the second sub-pixel value (197) into the sub-pixel R (4,2), sub-pixel G (5,2) and sub-pixel B (6,2) of the fifth pixel of the original depth frame O, and stores the third sub-pixel value (202) into the sub-pixel R (7,2), sub-pixel G (8,2) and sub-pixel B (9,2) of the sixth pixel of the original depth frame O. In the final pixel of the resized depth frame D, the first sub-pixel value (28) is obtained from the position (1,6) (sub-pixel R), the second sub-pixel value (31) is obtained from the position (2,6) (sub-pixel G), and the third sub-pixel value (35) is obtained from the position (3,6) (sub-pixel B). Then, the pixel storing unit 12 stores the first sub-pixel value (28) into the sub-pixel R (1,6), sub-pixel G (2,6) and sub-pixel B (3,6) of the sixteenth pixel of the original depth frame O, stores the second sub-pixel value (31) into the sub-pixel R (4,6), sub-pixel G (5,6) and sub-pixel B (6,6) of the seventeenth pixel of the original depth frame O, and stores the third sub-pixel value (35) into the sub-pixel R (7,6), sub-pixel G (8,6) and sub-pixel B (9,6) of the eighteenth pixel of the original depth frame O. Therefore, the size of the original depth frame O is triple of the resized depth frame D along the row direction D1, and is equivalent to the resized depth frame D along the column direction D2. Regarding to the total data volume, the data volume of the original depth frame O is triple of the resized depth frame D. To be noted, the order for retrieving the sub-pixel values is for an example only. In other embodiments, the order for retrieving and storing the sub-pixel values can be different (or the relative positions of the resized data can be different) so as to improve the accuracy of the restored size. For example, the first and fourth rows of FIG. 5C have the same order as the first and fourth rows of FIG. 5B, but the second and fifth rows of FIG. 5C are the result of shifting the second and fifth rows of FIG. 5B by one pixel (three sub-pixels), and the third and sixth rows of FIG. 5C are the result of shifting the third and sixth rows of FIG. 5B by two pixel. Accordingly, the data in the resized depth frame and the original depth frame can have different orders, so that the resized depth frame can still keep the accuracy.

The rearrangement or shift of the sub-pixel values is for an illustration only, and this invention is not limited thereto. In addition, the size of the resized depth frame D and each pixel including three sub-pixels are for illustrations only. Of course, in other embodiments, the size of the resized depth frame D and the number of sub-pixels in each pixel can be different, and this invention is not limited. For example, each pixel may include 2, 4 or more sub-pixels.

Figure 6A:
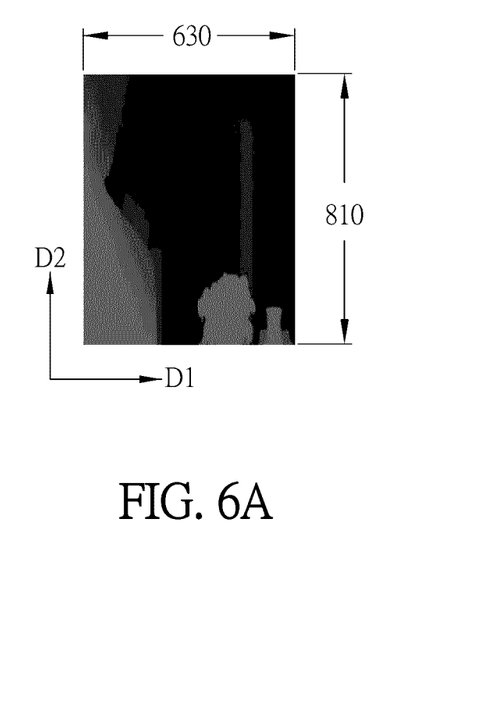
FIG. 6A is a schematic diagram showing the image of another resized depth frame according to the preferred embodiment of the invention.
Figure 6B:
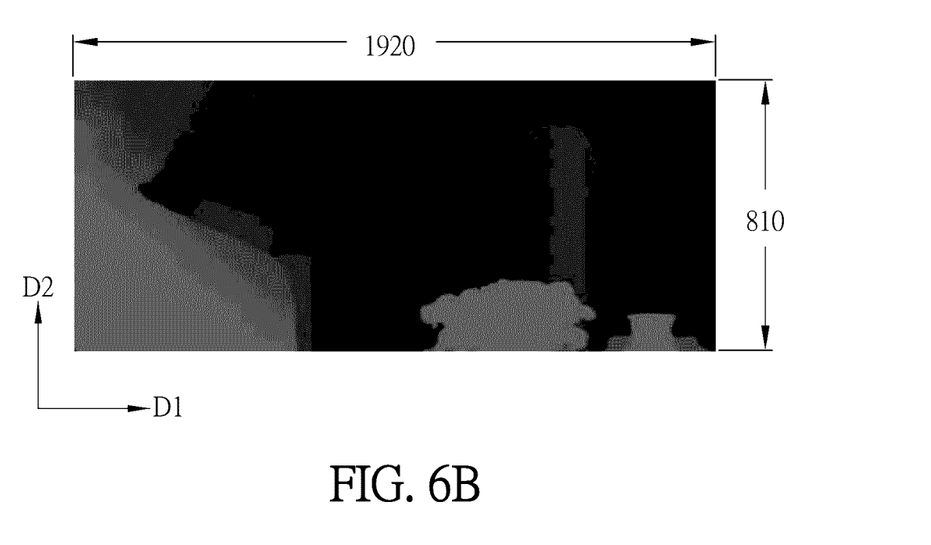
FIG. 6B is a schematic diagram showing the image of a restored original depth frame (by the method of FIG. 5B) according to the preferred embodiment of the invention.
Figure 6C:
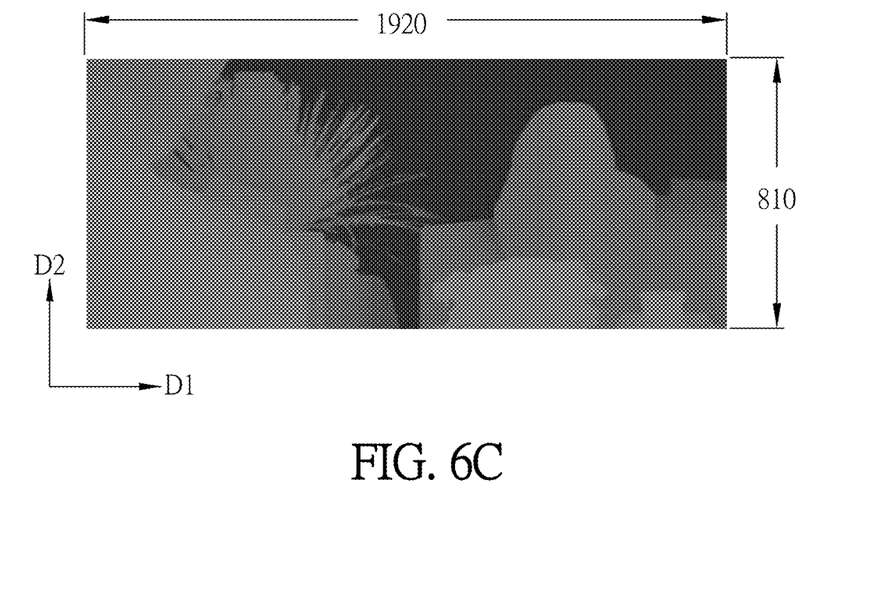
FIG. 6C is a schematic diagram showing the image of another restored original depth frame (by the method of FIG. 5C) according to the preferred embodiment of the invention.

FIG. 6A is a schematic diagram showing the image of another resized depth frame according to the preferred embodiment of the invention, FIG. 6B is a schematic diagram showing the image of a restored original depth frame (by the method of FIG. 5B) according to the preferred embodiment of the invention, and FIG. 6C is a schematic diagram showing the image of another restored original depth frame (by the method of FIG. 5C) according to the preferred embodiment of the invention. Herein, the image of the resized depth frame of FIG. 6C is similar to that of FIG. 6A, so it is not shown. FIGS. 6B and 6C correspond to the methods of FIGS. 5B and 5C, respectively. Although the resizing methods for FIGS. 6B and 6C are different, the shown images in FIGS. 6B and 6C are very close and seem the same as viewing by eyes. The size (resolution) of the gray-level frame in FIG. 6A is 640×810, and the size (resolution) of the gray-level frame in FIGS. 6B and 6C is 1920×810 (wherein, 1920=640×3). As a result, the size of the original depth frame in FIGS. 6B and 6C is triple of the resized depth frame in FIG. 6A.

Figure 7:
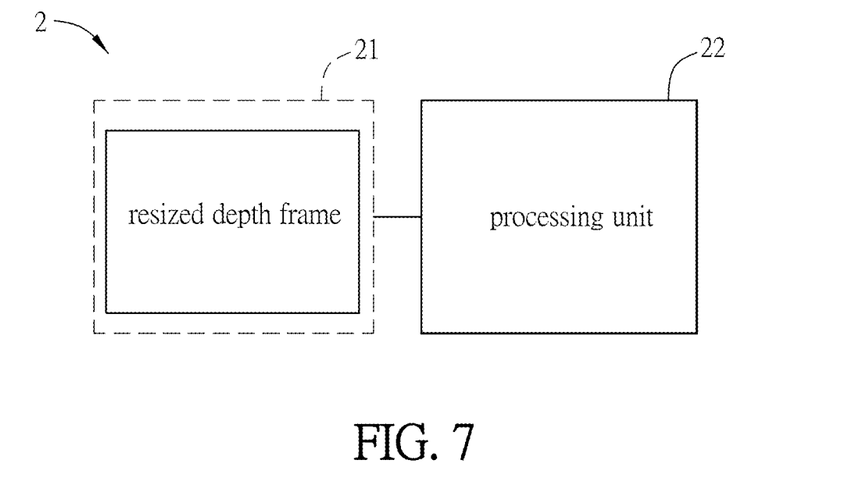
FIG. 7 is a block diagram showing a system for restoring a resized depth frame into an original depth frame according to a preferred embodiment of the invention.

FIG. 7 is a block diagram showing a system 2 for restoring a resized depth frame into an original depth frame according to a preferred embodiment of the invention.

The system 2 includes a memory unit 21 and a processing unit 22, which are electrically connected to each other. The memory unit 21 stores the resized depth frame and, of course, the original depth frame. The memory unit 21 can be a non-transitory computer readable storage medium, such as a memory, memory card, CD, tape, or any of their combinations, for storing the needed information. In this embodiment, the memory can be a ROM, RAM, flash memory, FPGA, and any usable memory, and this invention is not limited.

The processing unit 22 includes the core control assembly of the system 2, such as a CPU and a memory including any control hardware, software or firmware. In this embodiment, the processing unit 22 obtains at least a first sub-pixel value and a second sub-pixel value from a pixel of the resized depth frame. Then, the processing unit 22 stores the first sub-pixel value in all sub-pixels of a first pixel of the original depth frame, and stores the second sub-pixel value to all sub-pixels of a second pixel of the original depth frame. In different aspects, the first pixel and the second pixel of the original depth frame can be positioned at the same column or row of the original depth frame, so that the size of the original depth frame is triple of the resized depth frame along a column direction or a row direction.

The technical features of the system 2 for restoring a resized depth frame into an original depth frame can be referred to the above method and device 1, so the detailed description thereof will be omitted.

In summary, the method for restoring a resized depth frame into an original depth frame includes the steps of: obtaining a first sub-pixel value from one pixel of the resized depth frame; storing the first sub-pixel value in all sub-pixels of a first pixel of the original depth frame; obtaining a second sub-pixel value of the pixel of the resized depth frame; and storing the second sub-pixel value to all sub-pixels of a second pixel of the original depth frame. Accordingly, the method, device and system for restoring a resized depth frame into an original depth frame of the invention are different from the conventional method, device and system and can be applied to 3D image restoring system.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for restoring a resized depth frame into an original depth frame, comprising steps of:
    obtaining a first sub-pixel value from sub-pixels of one pixel of the resized depth frame wherein each of the pixels of the resized depth frame has three sub-pixels;
    storing the first sub-pixel value in all sub-pixels of a first pixel of the original depth frame wherein each of the pixels of the original depth frame has three sub-pixels, and each of the sub-pixels has the same sub-pixel values;
    obtaining a second sub-pixel value from the sub-pixels of the pixel of the resized depth frame; and
    storing the second sub-pixel value to all sub-pixels of a second pixel of the original depth frame.

2. The method of claim 1, wherein the first pixel and the second pixel of the original depth frame are positioned at the same column of the original depth frame.

3. The method of claim 1, wherein the first pixel and the second pixel of the original depth frame are positioned at the same row of the original depth frame.

4. The method of claim 1, wherein the size of the original depth frame is triple of the resized depth frame along a column direction.

5. The method of claim 1, wherein the size of the original depth frame is triple of the resized depth frame along a row direction.

6. A device for restoring a resized depth frame into an original depth frame, comprising:
    a pixel retrieving unit for obtaining at least a first sub-pixel value and a second sub-pixel value from sub-pixels of a pixel of the resized depth frame, wherein each of the pixels of the resized depth frame has three sub-pixels; and a pixel storing unit for storing the first sub-pixel value in all sub-pixels of a first pixel of the original depth frame, and storing the second sub-pixel value to all sub-pixels of a second pixel of the original depth frame, wherein each of the pixels of the original depth frame has three sub-pixels, and each of the sub-pixels have the same sub-pixel values.

7. The device of claim 6, wherein the first pixel and the second pixel of the original depth frame are positioned at the same column of the original depth frame.

8. The device of claim 6, wherein the first pixel and the second pixel of the original depth frame are positioned at the same row of the original depth frame.

9. The device of claim 6, wherein the size of the original depth frame is triple of the resized depth frame along a column direction.

10. The device of claim 6, wherein the size of the original depth frame is triple of the resized depth frame along a row direction.

11. A system for restoring a resized depth frame into an original depth frame, comprising:
a memory unit for storing the resized depth frame, wherein each of the pixels of the resized depth frame has three sub-pixels; and
a processing unit for obtaining at least a first sub-pixel value and a second sub-pixel value from the sub-pixels of a pixel of the resized depth frame, storing the first sub-pixel value in all sub-pixels of a first pixel of the original depth frame, and storing the second sub-pixel value to all sub-pixels of a second pixel of the original depth frame, wherein each of the pixels of the original depth frame has three sub-pixels, and each of the sub-pixels have the same sub-pixel values.

12. The system of claim 11, wherein the first pixel and the second pixel of the original depth frame are positioned at the same column of the original depth frame.

13. The system of claim 11, wherein the first pixel and the second pixel of the original depth frame are positioned at the same row of the original depth frame.

14. The system of claim 11, wherein the size of the original depth frame is triple of the resized depth frame along a column direction.

15. The system of claim 11, wherein the size of the original depth frame is triple of the resized depth frame along a row direction.

16. A device for restoring a resized depth frame into an original depth frame, comprising:
a pixel retrieving unit for obtaining at least a first sub-pixel value, a second sub-pixel value and a third sub-pixel value from three sub-pixels of a pixel of the resized depth frame; and
a pixel storing unit for storing the first sub-pixel value in all sub-pixels of a first pixel of the original depth frame, storing the second sub-pixel value to all sub-pixels of a second pixel of the original depth frame, and storing the third sub-pixel value to all sub-pixels of a third pixel of the original depth frame, wherein each of the pixels of the original depth frame has three sub-pixels, and each of the sub-pixels have the same sub-pixel values.

17. The device of claim 16, wherein the first pixel, the second pixel and the third pixel of the original depth frame are located on the same column of the original depth frame, and the size of the original depth frame is triple of the resized depth frame along a column direction.

18. The device of claim 16, wherein the first pixel, the second pixel and the third pixel of the original depth frame are located on the same row of the original depth frame, and the size of the original depth frame is triple of the resized depth frame along a row direction.

19. The method of claim 1, further comprising:
obtaining a third sub-pixel value from the sub-pixels of the pixel of the resized depth frame; and storing the third sub-pixel value to all sub-pixels of a third pixel of the original depth frame.

20. The device of claim 6, wherein the pixel retrieving unit is configured to obtain a third sub-pixel value from the sub-pixels of the pixel of the resized depth frame, and the pixel storing unit is configured to store the third sub-pixel value to all sub-pixels of a third pixel of the original depth frame.

21. The system of claim 11, wherein the processing unit is configured to obtain a third sub-pixel value from the sub-pixels of the pixel of the resized depth frame, and the processing unit is configured to store the third sub-pixel value to all sub-pixels of a third pixel of the original depth frame.

* * * * *